US012711330B2

(12) United States Patent
Kanungo et al.

(10) Patent No.: US 12,711,330 B2
(45) Date of Patent: Aug. 18, 2026

(54) AUTOMATICALLY GENERATING ANNOTATED GROUND-TRUTH CORPUS FOR TRAINING NLU MODEL

(71) Applicant: Samsung Electronics Co., Ltd., Suwon-si (KR)

(72) Inventors: Tapas Kanungo, Redmond, WA (US); Jiun-Hao Jhan, Mountain View, CA (US); Qingxiaoyang Zhu, Woodland, CA (US); Nehal Bengre Juraska, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 313 days.

(21) Appl. No.: 18/223,754

(22) Filed: Jul. 19, 2023

(65) Prior Publication Data

US 2024/0169165 A1 May 23, 2024

Related U.S. Application Data

(60) Provisional application No. 63/426,239, filed on Nov. 17, 2022.

(51) Int. Cl.
*G06F 40/58* (2020.01)

(52) U.S. Cl.
CPC .................................... *G06F 40/58* (2020.01)

(58) Field of Classification Search
CPC .... G06F 40/211; G06F 40/253; G06F 40/268; G06F 40/284; G06F 40/30; G06F 40/58; G10L 15/00
See application file for complete search history.

(56) References Cited

U.S. PATENT DOCUMENTS 10,242,667 B2 3/2019 Sharma
10,579,738 B2 3/2020 Johnson
10,796,104 B1 * 10/2020 Lee ........................ G06N 20/00
10,824,818 B2 * 11/2020 Peper ....................... G06N 7/01
10,902,846 B2 1/2021 Kim
10,997,374 B2 5/2021 Bouamor
11,043,208 B1 * 6/2021 Michelin ................. G06F 40/35
11,158,308 B1 * 10/2021 Bissell .................... G10L 15/22
11,321,519 B1 * 5/2022 Phan ..................... G06F 40/226
11,475,220 B2 10/2022 Aditya
11,550,786 B1 * 1/2023 Naganathan .......... G06F 16/243
11,562,735 B1 * 1/2023 Gupta ................. G10L 15/1822
11,574,637 B1 * 2/2023 Kumar .................... G10L 15/22
12,321,701 B2 * 6/2025 Anand .................. G06F 40/284
2007/0016401 A1 * 1/2007 Ehsani .................... G06F 40/55
704/9
2008/0222128 A1 * 9/2008 Yoshida .................. G06F 16/48
707/999.005

(Continued)

*Primary Examiner* — Lamont M Spooner

(57) ABSTRACT

In one embodiment, a method includes accessing an initial corpus of ground-truth utterances in a first language, each ground truth utterance annotated with one or more intent labels and one or more slot labels, each slot label having an associated slot value. The method includes generating a translated, annotated corpus in a second language by delexicalizing each utterance and translating portions of the delexicalized utterance to the second language. The method includes creating a multilingual natural language model by training a natural-language model using the translated corpus.

20 Claims, 5 Drawing Sheets

(56) References Cited

U.S. PATENT DOCUMENTS

2010/0268536 A1* 10/2010 Suendermann ......... G10L 15/22
704/E15.008
2015/0127319 A1* 5/2015 Hwang ................... G06F 40/40
704/2
2017/0286272 A1* 10/2017 Yang ....................... G06F 9/454
2017/0372702 A1* 12/2017 Wang ...................... G06F 16/00
2018/0307679 A1* 10/2018 Duong .................... G06F 40/30
2019/0102390 A1* 4/2019 Antunes ................ G06F 40/295
2019/0197119 A1* 6/2019 Zhang ..................... G06F 16/35
2019/0318725 A1* 10/2019 Le Roux ................. G10L 17/00
2019/0333500 A1* 10/2019 Kim ........................ G10L 15/22
2020/0184158 A1* 6/2020 Kuczmarski ........... G06N 20/00
2020/0312298 A1* 10/2020 Bui .......................... G06F 3/167
2020/0320984 A1* 10/2020 Kuczmarski ........... G06N 20/00
2020/0387677 A1* 12/2020 Kim ........................ G06F 40/35
2020/0402509 A1* 12/2020 Fujimoto ................ G06F 3/167
2020/0410989 A1* 12/2020 Ray ....................... G06F 40/216
2021/0082400 A1* 3/2021 Vishnoi ................... G06F 40/30
2021/0210076 A1* 7/2021 Kuczmarski ........ G06F 16/3329
2021/0358486 A1* 11/2021 Lee ......................... G06F 40/58
2021/0390951 A1* 12/2021 Gadde ................... G06F 40/186
2022/0101839 A1* 3/2022 George ................. G06F 40/284
2022/0129461 A1* 4/2022 Haprian ............ G06F 16/24526
2022/0155926 A1* 5/2022 Bhatt ...................... G10L 15/18
2022/0188304 A1* 6/2022 Samal ..................... G10L 15/22
2022/0198327 A1* 6/2022 Wang ..................... G06N 5/022
2022/0199079 A1* 6/2022 Hanson ................... H04L 51/02
2022/0309254 A1* 9/2022 Kotnis .................... G06F 40/49
2023/0069049 A1* 3/2023 Zhou ................... G10L 15/1815
2023/0073932 A1* 3/2023 Yuan ...................... G06V 30/41
2023/0081306 A1* 3/2023 Kuo ......................... G06N 3/09
704/200
2023/0086302 A1* 3/2023 Bhagavath .............. G10L 15/22
704/9
2023/0115321 A1* 4/2023 Vu .......................... G06F 40/30
704/232
2023/0289538 A1* 9/2023 Goel ....................... G06F 40/58
2023/0297603 A1* 9/2023 M'Hamdi ............. G06F 40/279
2023/0320642 A1* 10/2023 Lin ......................... G06F 40/30
2023/0335120 A1* 10/2023 Kim ........................ G10L 15/22
2023/0351270 A1* 11/2023 Zou ........................ G06N 20/20
2023/0367978 A1* 11/2023 Gritta ...................... G06F 40/58
2023/0376700 A1* 11/2023 Bista ..................... G06F 40/284
2024/0061833 A1* 2/2024 Tangari ................. G06F 16/243
2024/0119932 A1* 4/2024 Khorshid ................ G10L 15/22
2024/0126818 A1* 4/2024 Zhao ................... G06F 16/9035
2024/0135116 A1* 4/2024 Vu .......................... G06F 40/20
2024/0185000 A1* 6/2024 Das ......................... G06F 40/30
2024/0386883 A1* 11/2024 Darla .................... G06F 40/216
2025/0321964 A1* 10/2025 Kondiles ............. G06F 11/2094

* cited by examiner

AUTOMATICALLY GENERATING ANNOTATED GROUND-TRUTH CORPUS FOR TRAINING NLU MODEL

PRIORITY CLAIM

This application claims the benefit under 35 U.S.C. § 119 of U.S. Provisional Patent Application 63/426,239 filed Nov. 17, 2022, which is incorporated by reference herein.

TECHNICAL FIELD

This application generally relates to automatically generating annotated ground-truth corpus for training an NLU model.

BACKGROUND

A natural-language understanding (NLU) model can receive input in the form of spoken or written natural language. Some NLU models can also provide output in natural language. For example, an electronic voice assistant can receive natural-language input, such as spoken queries, from a person; parse the natural-language input to determine appropriate corresponding actions for a computer to perform; and provide a natural-language output response to the person. For example, a person may input "when will it be light out tomorrow?" and a NLU model in a voice assistant may in response parse that input into a set of actions, perform those actions, and then assemble the results into natural-language output (e.g., "tomorrow, the sun will rise at approximately 5:59 a.m. and set at approximately 8:12 pm"). Examples of NLU models include BERT, GPTn, RoBERTa, and XLNet, among others.

DESCRIPTION OF EXAMPLE EMBODIMENTS

Task-oriented dialogue systems, such as used by voice assistants or voice-enabled devices, typically operate in a limited set of languages due to a lack of annotated multilingual corpus. For instance, for each utterance in a corpus, the slot values in the utterance need to be identified and given slot label(s) that correspond to the slot labels used by the dialogue system so that the system can parse the utterance into input that can be understood and acted on by the system.

Machine learning systems, such as natural-language models used by a dialogue system, are good at generalizing from given ground truth examples. However, in order to build a useful natural-language model, the model needs to be trained using ground-truth examples, i.e., using utterances that are accurately annotated according to the model's labels. A corpus of ground-truth utterances can often consist of several million utterances, and creating these annotated utterances across many languages can be very resource-intensive, because for each language a person needs to identify the relevant slot values in each translated utterance, and accurately label those slot values with slot labels that the model understands. Repeating this process for each language is a difficult and intensive task, as the corpus builder must have expert knowledge of the translated language, the slot labels used by the system, and how those slot labels correspond to specific slot values in the translated language. However, generating an annotated ground-truth corpus is a necessary prerequisite for an NLU model, such as an NLU model used by a dialogue system, to perform tasks in a particular language.

Figure 1:
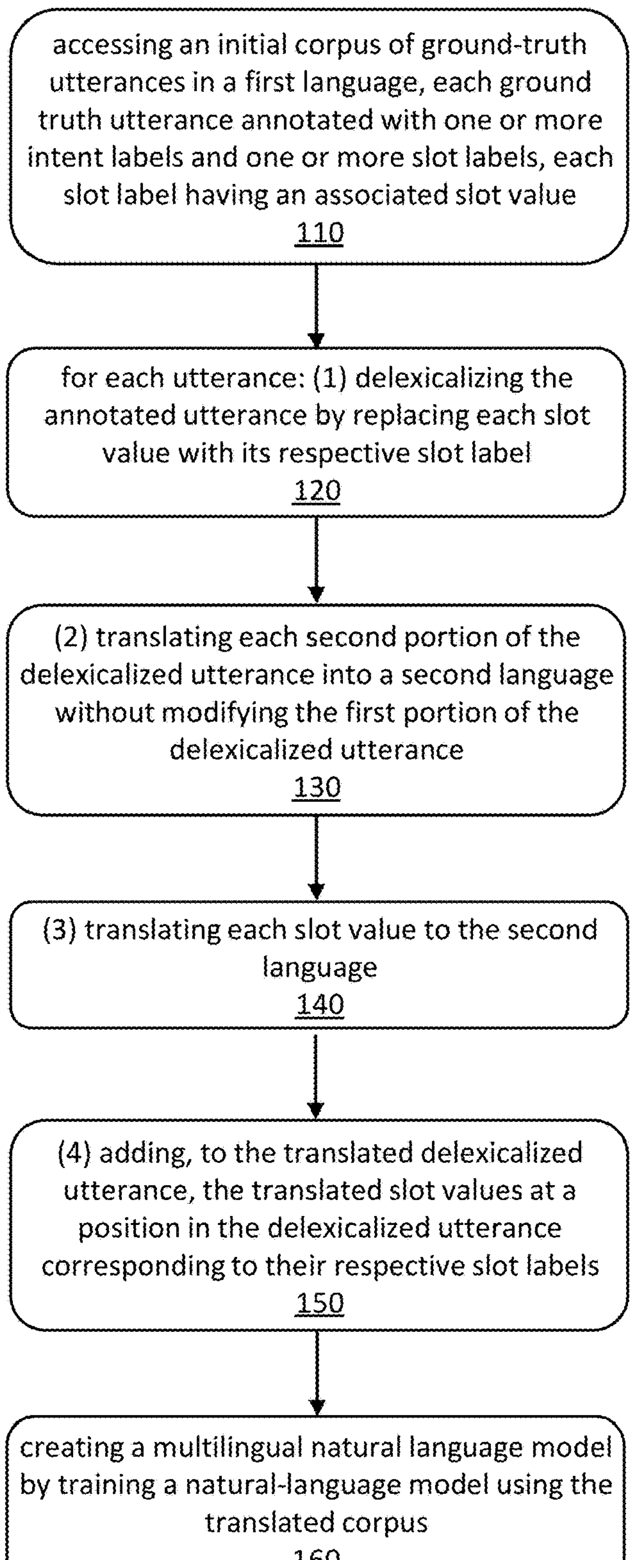
FIG. 1 illustrates an example method of generating a multilingual NLU model starting with only one corpus of annotated ground-truth utterances in one first language.

FIG. 1 illustrates an example method of generating a multilingual NLU model starting with only one corpus of annotated ground-truth utterances in one first language. For example, the first language may be English, Korean, Spanish, or any other language, and the multilingual NLU model may, after training, receive input and provide output in any number of other languages, as described more fully herein. As explained herein, the example method of FIG. 1 automatically generates an annotated ground-truth corpus in each of the other languages and therefore does not require experts to create an annotated corpus in those languages. As used herein, "utterance" includes strings of one or more words, and are not necessarily limited to strings that are actually uttered. Utterances may include phrases, sentences, multiple sentences, etc.

Figure 2:
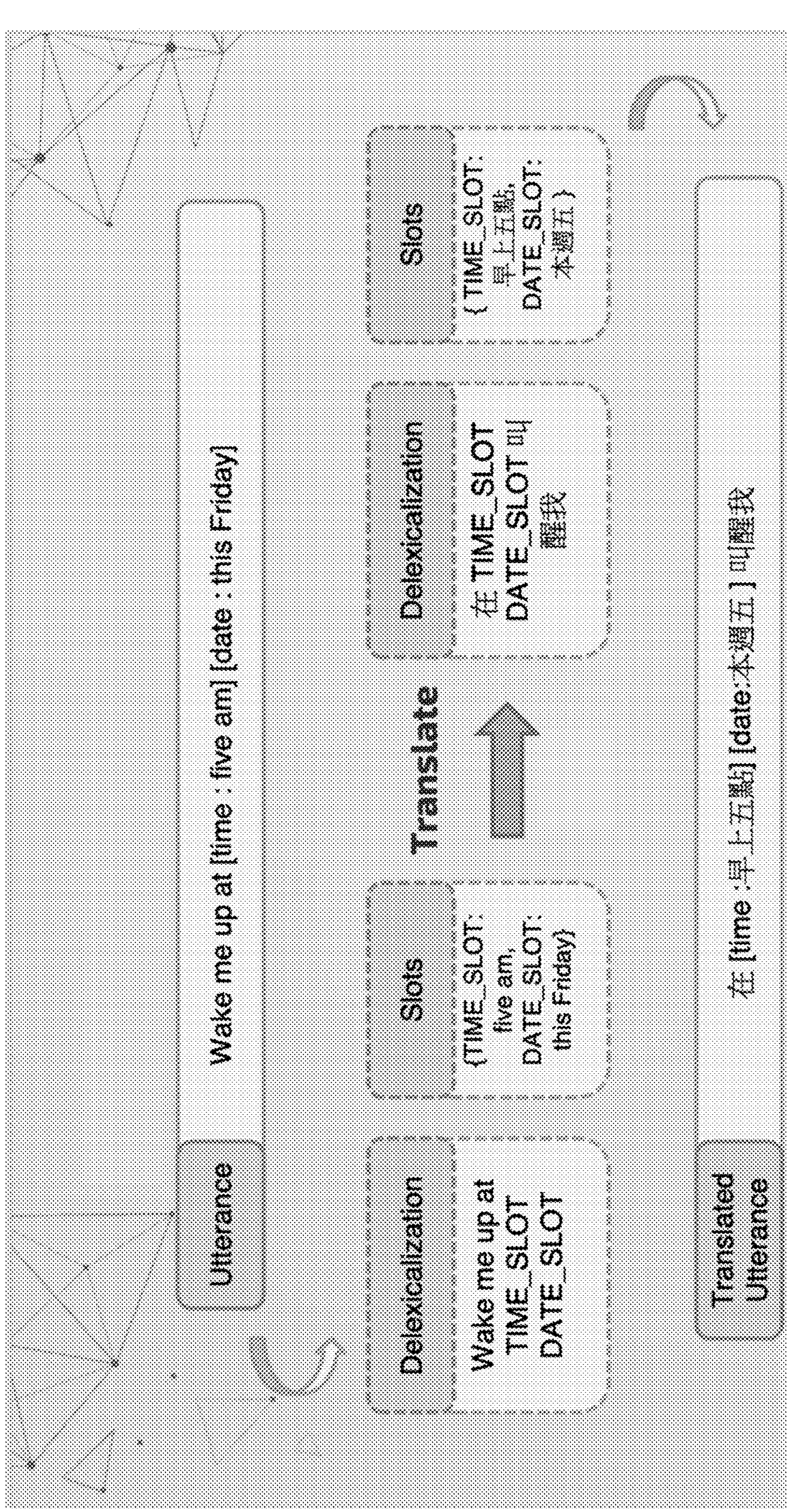
FIG. 2 illustrates an example delexicalization and relexicalization of an utterance.

Step 110 of the example method of FIG. 1 includes accessing an initial corpus of ground-truth utterances in a first language, each ground truth utterance annotated with one or more intent labels and one or more slot labels, each slot label having an associated slot value. Each utterance is made up of words (in the first language) in a particular order. For instance, FIG. 2 illustrates an example utterance "Wake me up at five am this Friday." Each ground-truth utterance is the utterance as annotated with slot labels, slot values, and intent labels. For instance, in the example of FIG. 2, "five am" is the slot value for the slot label "time" and "this Friday" is the slot value for the slot label "date." The intent is a label (or labels) that identify an action or actions for a computing device to take in response to the utterance. For instance, "set alarm" is one example intent for the example utterance in FIG. 2. As explained above, annotating utterances is a resource-intensive task that requires understanding the language being annotated and the slot labels and intent labels that are used by an NLU model.

Steps 120-140 of the example method of FIG. 1 includes generating a translated, annotated corpus in a second language. The second language can be any suitable language that is different than the first language. As explained herein, the translated corpus is automatically annotated with slot and intent labels, resulting in a translated, annotated corpus that doesn't require expert ground-truth labelling. To generate the translated, annotated corpus, steps 120-140 are perform for each annotated utterance in the initial corpus.

Step 120 of the example method of FIG. 1 includes delexicalizing the annotated utterance by replacing each slot value with its respective slot label, also known as slot tags. Each delexicalized utterance includes a first portion including one or more slot labels and a second portion including all other words in the delexicalized utterance. For instance, in the example of FIG. 2, the annotated utterance "Wake me up at [time: five am] [date: this Friday]" is delexicalized to "Wake me up at TIME_SLOT DATE_SLOT," where TIME_SLOT and DATE_SLOT represent slot labels. In this example, the second portion includes "Wake me up at" and the first portion includes the two slot labels. While the first portion and second portion are not intermixed, in this example, subsets of the first and second portion may be intermixed or interspersed amongst each other in other examples. In particular embodiments, each slot tag is given a unique slot ID.

Figure 3:
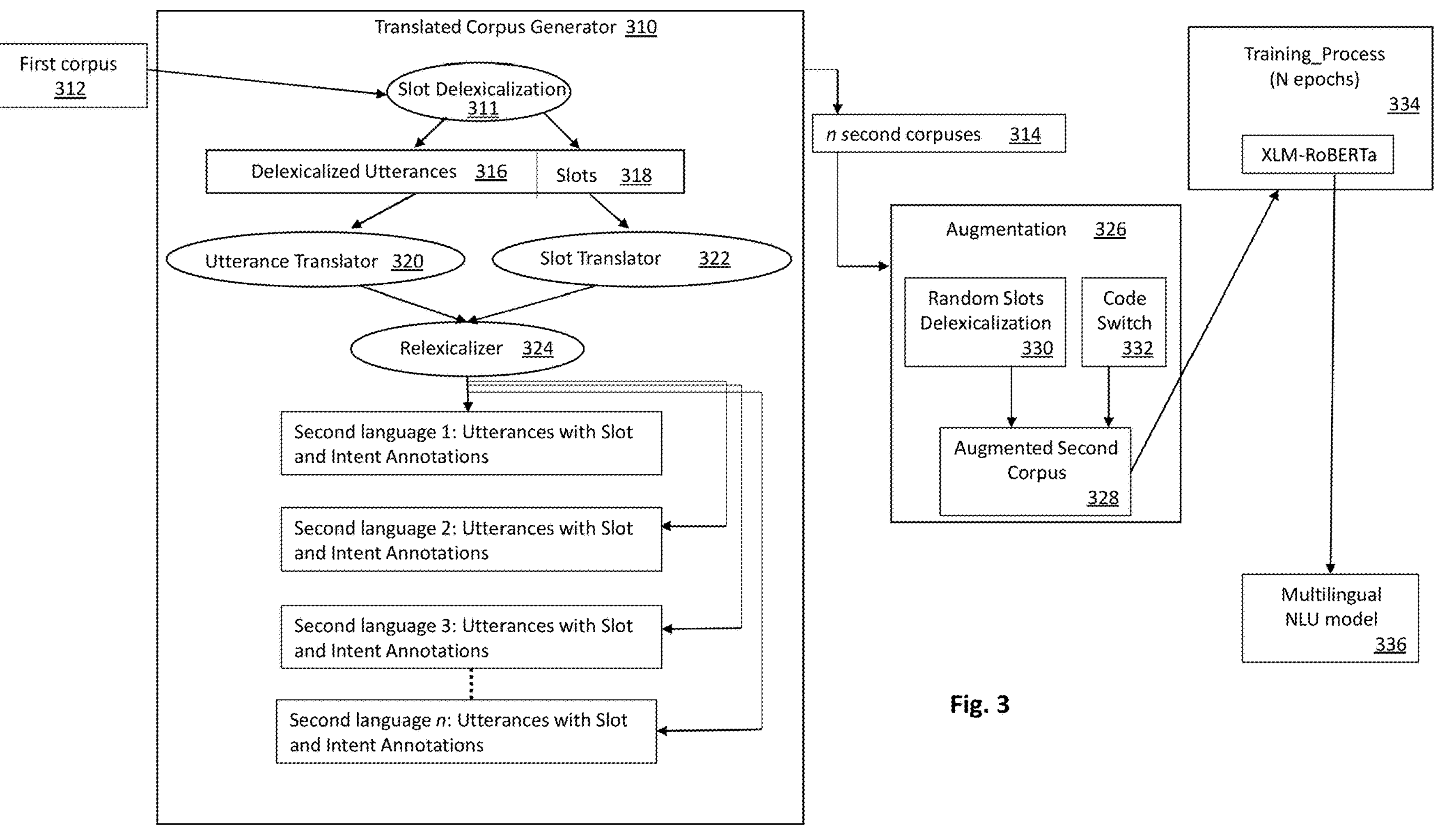
FIG. 3 illustrates an example process for generating a translated, annotated corpus in a second language in accordance with the example method of FIG. 1.

FIG. 3 illustrates an example process for automatically generating a translated, annotated corpus in a second language in accordance with the example method of FIG. 1. In the example of FIG. 3, a translated corpus generator 310 receives data from an initial corpus 312 of annotated ground-truth utterances. The translated corpus generator 310 automatically generates the translated second corpus, which includes translated, annotated utterances. The translated corpus generator 310 delexicalizes 311 each annotated utterance from the initial corpus and separately outputs the delexicalized utterances 316 and the replaced slot values in the utterance. For instance, in the example of FIG. 2, the translated corpus generator outputs the delexicalized utterance and, separately, the replaced slot values, along with their slot labels (collectively, slots 318 in the example of FIG. 3). In particular embodiments, a lookup table is created to map the delexicalized slots to the extracted slot values.

Step 130 of the example method of FIG. 1 includes translating each second portion of the delexicalized utterance into a second language without modifying the first portion of the delexicalized utterance. Step 140 of the example method of FIG. 1 includes translating each slot value to the second language. For instance, in the example of FIG. 3, the second portion of the delexicalized utterance 316 may be provided as input to an automatic translation program (i.e., the utterance translator 320). Similarly, the extracted slot values may be separately provided as input to the same or to a different translation program (e.g., the slot translator 322). FIG. 2 illustrates an example of the output after the translations in steps 130 and 140 are performed. As illustrated in FIG. 2, the entire delexicalized utterance, i.e., both the first portion and the second portion, may be input to a translator. However, the translator translates only the second portion of the utterance (e.g., because the translator does not recognize the slot labels "TIME_SLOT", or because the translator is instructed to ignore those labels). The translator outputs a translation of the delexicalized utterance that includes the slot labels in the first language. While the second portion of the delexicalized utterance is translated, the first portion is not translated, and typically the translator will use its own NLU model to predict where the untranslated/unknown strings corresponding to the slot labels (i.e., the first portion of the delexicalized utterance) will go. In the example of FIG. 2, the end result is a translated delexicalized utterance that includes slot labels in the first language. As illustrated in FIG. 2 and FIG. 3, the slot values in the first language are translated to the second language separate from the translation of the delexicalized utterance itself.

Step 150 of the example method of FIG. 1 includes adding, to the translated delexicalized utterance, the translated slot values at a position in the delexicalized utterance corresponding to their respective slot labels. This step may be performed by a relexicalizer 324, as illustrated in the example of FIG. 3. As illustrated in FIG. 3, in particular embodiments the translated corpus generator 310 executes on each annotated utterance for n second languages, resulting in n relexicalized, translated utterances. As a result, once the translated corpus generator processes the initial corpus, the resulting output is n translated second corpuses 314, each corpus containing annotated utterances in one of the n languages.

Referring to step 150 in the example of FIG. 2, the separately translated slot values are placed in the translated, delexicalized utterance at the respective position indicated by the "TIME_SLOT" and "DATE_SLOT" labels. The result is an annotated, relexicalized utterance in the target second language, and this result is generated automatically without requiring an expert to annotate a translation of the target utterance (e.g., annotate a Chinese translation of "Wake me up at five am this Friday"). This process is also different than the typical expert process of translating an utterance into a second language, identifying slot values in the translations, and then annotating those slot values with slot labels. Moreover, translating an entire utterance (slot values and all) results in loss of slot information, as words corresponding to slot values may be in different locations in different languages or may be represented by a different number of words. In addition, translating slot values together with the rest of an utterance may result in different translations than when those values are translated separately from the rest of the utterance (e.g., because the translator may take a word's context into account when translating that word), which may also obscure the slot-label identification. In contrast, steps 120-150 force the translator to separately translate the slot values from the first language to the second language, which is part of what makes tagging those values in the second language feasible. Ultimately, when a delexicalized utterance with slot labels and slot values are translated separately and then re-lexicalized, the resulting annotated, translated utterance is more likely to be accurate compared to an annotated, translated utterance generated by providing the entire ground-truth utterance in the first language to the translation system.

Intent label(s) for the utterance in the initial corpus can be used as intent label(s) for the translated, annotated utterance. Particular embodiments may translate the intent label to the second language, while particular embodiments may not perform this translation and may instead associated the translated, annotated utterances with their respective intent labels in the first language.

Step 160 of the example method of FIG. 1 includes creating a multilingual natural language model by training a natural-language model using the translated corpus(es). In particular embodiments, as explained more fully below, a translated corpus may be an augmented translated corpus. The natural-language model may be any suitable multilingual language model, such as BERT, GPTn, RoBERTa, and XLNet. In particular embodiments, as illustrated in the example of FIG. 3, the natural-language model may be trained for N epochs by training process 334, until a desired convergence (e.g., according to a particular objective function for the model) between model output on test data and the ground-truth data is obtained. Notably, as explained herein, each of the n ground-truth corpuses is automatically generated from a single first annotated initial corpus. The result of step 160 is a multilingual NLU model (e.g., multilingual NLU model 336, in the example of FIG. 3) trained on the n languages, and this trained model can be obtained much more quickly and efficiently than in conventional techniques that require expert creation of each of the n second corpuses.

In particular embodiments, a training process may begin with a pre-trained NLU model (e.g., a pre-trained XLM-Roberta model trained on the initial corpus), and multilingual training may then fine-tune the NLU model parameters to create a multilingual NLU. Particular embodiments may simultaneously train an NLU model's intent and slot recognition system.

Particular embodiments may train various classification heads of an NLU model. For example, some embodiments may train heads for intent and slots prediction, bag-of-slot labels, and language-order prediction. For example, an intent and slot prediction portion of an NLU model may perform intent classification and slot-filling tasks. To train this portion, the initial corpus may be used along with the annotated translated corpus described above. For intent classification, the model predicts the intent by using the pooled output from the XLM-R encoder, which is the sentence-level embedding vector. Then, the model predicts slot logits (e.g., as a sequence labeling task) using XLM-R encoder representations of each token in the utterance. Then a cross entropy loss function may be used to compare the intent and slot logits with ground truth labels to get the intent and slot loss.

As another example, a bag-of-slots portion of an NLU model may be trained using n second corpuses. Since each utterance has multiple annotated versions, the constraint that all utterances have the same intent and slot labels can be leveraged. The initial utterance (e.g., in English) and the corresponding utterances in other languages are first batched into one block. The meaning of the utterances in each block is the same, but they are expressed in different languages. Thus, the output of the NLU model on each utterance within a block should be the same or very similar. For instance, in a given block of translated multilingual utterances, each of the utterances should predict the same slot labels. Although the slot labels across languages may not be aligned at each token, the set of B-SLOTNAME and I-SLOTNAME slot tags (in the BIO format) in each utterance inside a batch is the same as others. The bag of slot labels is represented as a Dslots dimensional binary vector with each location indicating which slots labels are present in an utterance, where Dslots is the number of slot labels. Predictions in the different languages are output for intent classification and slot filling. Then, a cross entropy loss is applied between the predictions and the ground truth.

As another example, since the number of words in an utterance across the multiple languages and their word order might be different, computing loss per token may not always provide accurate prediction results because the tokens are not aligned across languages. Thus, the mean of the multiple languages' slot predictions may be determined and the frequency of each slot type among these utterances may be calculated. Computing a cross entropy loss between the mean slot label predictions and the frequency may align the slot label predictions across the n+1 (n second, translated corpuses plus the initial corpus) predictions.

As another example, word order is important in language. There are complicated rules for ordering words in different languages: two semantically identical utterances in different languages might have large differences in the word's position in the sentence. Some languages start a sentence with the subject (S) following the verb (V) and the object (O). Others might start with the verb and end with the object. Therefore, another classification head in an NLU model may be trained and used to predict the language word order given an input utterance. The training dataset may include a plurality of word order: types such as SVO, SOV, VSO, none type, and uncategorized. A cross entropy loss function may be determined between the order prediction and the ground truth for each of n+1 corpuses.

Prior to training a natural-language model, particular embodiments may augment 326 one or more of the n+1 corpuses and then train the model using the augmented corpus(es) 328. For example, particular embodiments may randomly select x percent (e.g., 5%, 10%, etc.) of the relexicalized utterances in an annotated corpus and, for each randomly selected utterance, perform random slot delexicalization 330 in which the slot values in the annotated utterance are replaced with corresponding slot labels. For example, the annotated utterance "Wake me up at [time: five am] [date: this Friday]" may be selected and delexicalized to "Wake me up at TIME_SLOT DATE_SLOT", and this delexicalized utterance is then added to the, e.g., English corpus (which includes the selected, annotated utterance) to create an augmented English corpus. The same process may be randomly performed for utterances in any of the n other corpuses. Random slot delexicalization helps the NLU model learn general templates of utterances in addition to the specific utterances themselves. In addition, augmenting a corpus with random delexicalizations may improve the NLU model's ability to learn slot-usage patterns across languages, as the slot labels operate as anchors across various languages.

As another example augmentation, particular embodiments may randomly select x percent (e.g., 5%, 10%, etc.) of the utterances in a translated corpus and, for each randomly selected utterance, perform codeswitching 332 on the utterance by swapping one or more words in the utterance with a corresponding translation of the one or more words in another language. For instance, in the example of FIG. 2, the word "wake" in English may be replaced with a French translation of the word "wake" (or translation in any other of the n languages), for example by sending the selected English word "wake" to French translation model. In particular embodiments, the one or more words may be stop words. Codeswitching may create anchor points across multiple languages and may result in vector representations of similar words in different languages being relatively near each other in representation space. Each codeswitched utterance is then added to its respective corpus to create an augmented corpus.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 5, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 5, by a processor coupled to non-transitory computer readable storage media, or any suitable combination thereof.

Figure 4:
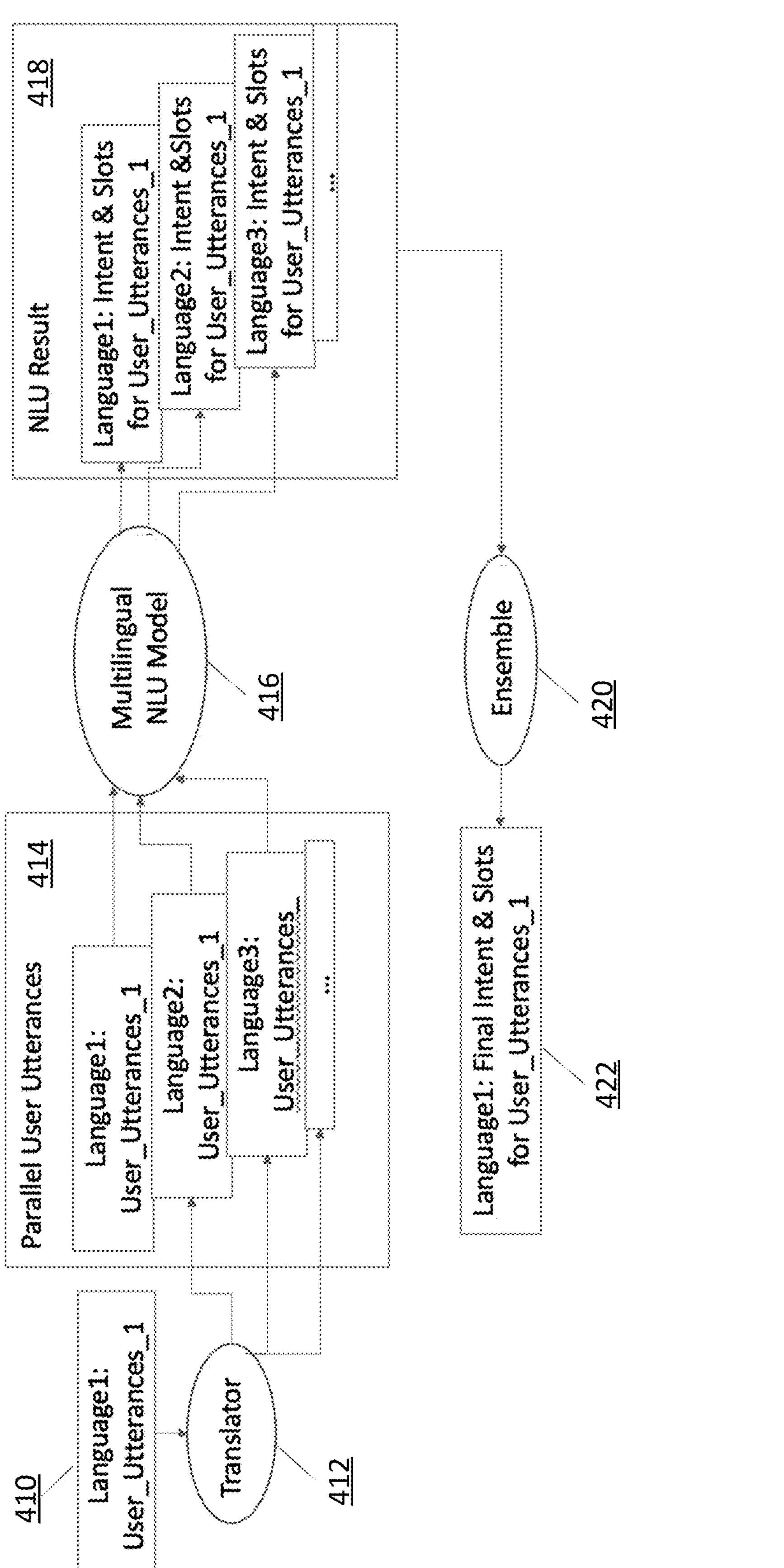
FIG. 4 illustrates an example use of the trained NLU model generated by the example method of FIG. 1.

Once the trained multilingual natural language model is created, e.g., as in step 160 of the example method of FIG. 1, then the model can be deployed to perform various language-related tasks at runtime. As explained above, the model is able to perform actions, such as voice-assistant actions, based on language input in any of the n+1 languages in which the natural language model was trained. In particular embodiments, the trained natural language model may also provide improved performance in any one language by taking an ensemble approach to input in a particular language. FIG. 4 illustrates an example in which the trained NLU model uses an ensemble approach to determine the intent and/or slot labels for an input utterance. As illustrated in FIG. 4, an input utterance 410 in a first language (Language 1) is input and, in real time, is translated 412 into y other languages. Each of the y languages are languages that the NLU model is trained on, e.g., according to the example method of FIG. 1. In particular embodiments, y may be the same as, or may be less than, n. After translating the input utterance into y translated utterances 414 in other languages, the original utterance and the translations are input into the trained NLU model 416. The model outputs, for each of the input utterances, a prediction of intent and slot labels for that utterance (e.g., as illustrated by NLU results 418). These predictions are then analyzed by an ensemble method 420 that selects a final prediction 422 for the intent and slot labels in the input language. For example, the ensemble method may select the most-predicted intent label and/or slot labels, determined across the NLU results for the input language and they translations. Rather than merely adopting the predicted output for the input language, these ensemble approaches look at predictions across languages and can improve system performance at runtime, particular for languages in which the voice assistant may be relatively inaccurate (e.g., for which limited or low-quality training data is provided).

Figure 5:
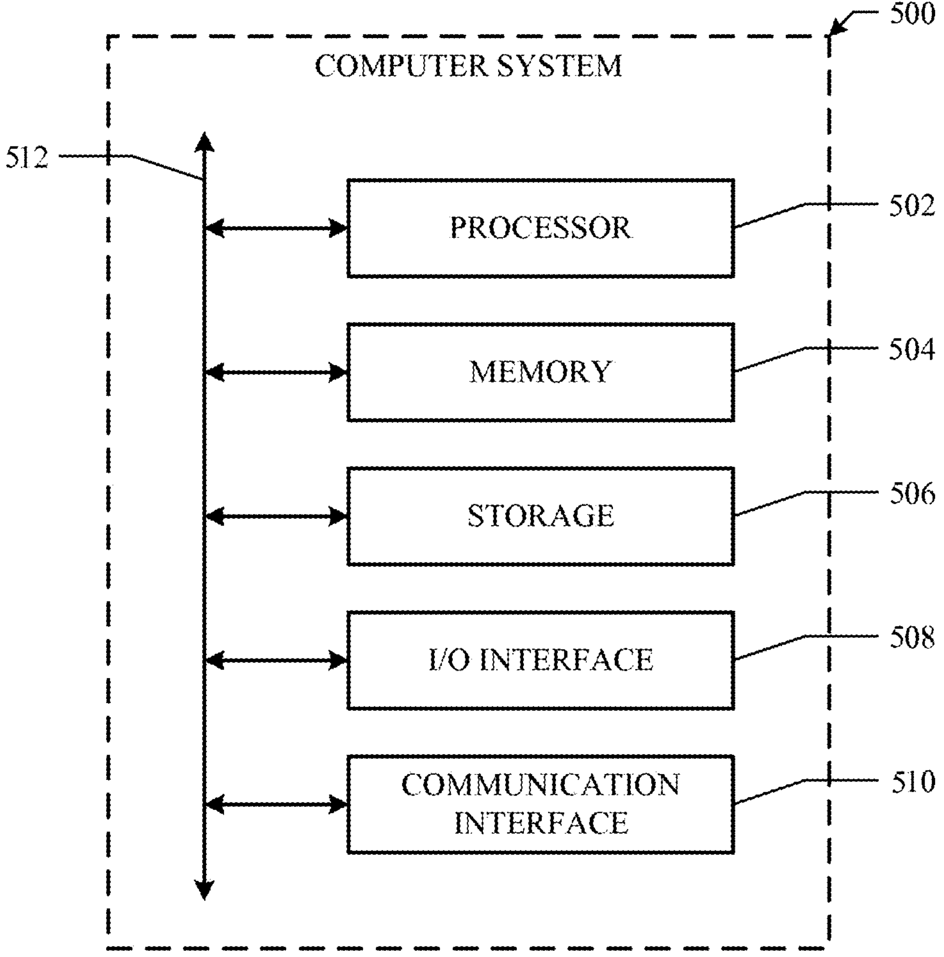
FIG. 5 illustrates an example computing system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache.

Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:

accessing an initial corpus of ground-truth utterances in a first language, each ground truth utterance annotated with one or more intent labels and one or more slot labels, each slot label having an associated slot value;

generating a translated, annotated corpus in a second language by, for each annotated utterance in the initial corpus:

delexicalizing the annotated utterance by replacing each slot value with its respective slot label in the annotated ground-truth utterance, wherein each delexicalized utterance comprises a first portion including one or more slot labels without any slot values and a second portion including all other words in the delexicalized utterance;

creating a translated delexicalized utterance comprising the second portion in a second language and the first portion in the first language by translating each second portion of the delexicalized utterance into a second language without modifying the first portion of the delexicalized utterance;

creating a translated slots portion comprising (1) each slot value in the second language and (2) its corresponding slot label in the first language by translating, separately from the translation of each portion of the delexicalized utterance, each slot value to the second language;

creating a translated annotated utterance by adding, to the translated delexicalized utterance, each translated slot value from the translated slots portion at that slot value's corresponding slot label's position in the delexicalized utterance; and creating a multilingual natural language model by training a natural-language model using the translated corpus.

2. The method of claim 1, further comprising generating, prior to creating the multilingual natural language model, an augmented translated corpus by:

randomly selecting, from the translated, annotated corpus, a plurality of annotated utterances;

for each selected annotated utterance, delexicalizing the utterance by replacing the slot values in the utterance with the corresponding slot labels; and adding each delexicalized utterance to the translated, annotated corpus.

3. The method of claim 1, further comprising generating, prior to creating the multilingual natural language model, an augmented translated corpus by:

randomly selecting, from the translated, annotated corpus, a plurality of annotated utterances;

for each selected annotated utterance, codeswitching the utterance by:

selecting a word in the utterance;

translating the selected word into a different language;

replacing the selected word with the translated word; and adding each codeswitched utterance to the translated, annotated corpus.

4. The method of claim 1, further comprising:

generating a plurality of translated, annotated corpuses in a plurality of corresponding second languages; and training the natural-language model using each of the plurality of translated corpuses.

5. The method of claim 1, wherein the multilingual natural language model comprises a plurality of classification heads.

6. The method of claim 5, wherein at least one of the classification heads is a bag-of-slots classification head or a language-order prediction head.

7. The method of claim 1, wherein the multilingual natural language model is part of a dialogue system.

8. A method comprising:

receiving an input utterance; and determining, using a multilingual natural language model, one or more intent labels and one or more slot labels for the utterance, wherein the multilingual natural language model was generated by:

accessing an initial corpus of ground-truth utterances in a first language, each ground truth utterance annotated with one or more intent labels and one or more slot labels, each slot label having an associated slot value;

generating a translated, annotated corpus in a second language by, for each annotated utterance in the initial corpus:

delexicalizing the annotated utterance by replacing each slot value with its respective slot label in the annotated ground-truth utterance, wherein each delexicalized utterance comprises a first portion including one or more slot labels without any slot values and a second portion including all other words in the delexicalized utterance;

creating a translated delexicalized utterance comprising the second portion in a second language and the first portion in the first language by translating each second portion of the delexicalized utterance into a second language without modifying the first portion of the delexicalized utterance;

creating a translated slots portion comprising (1) each slot value in the second language and (2) its corresponding slot label in the first language by translating, separately from the translation of each portion of the delexicalized utterance, each slot value to the second language;

creating a translated annotated utterance by adding, to the translated delexicalized utterance, each translated slot value from the translated slots portion at that slot value's corresponding slot label's position in the delexicalized utterance; and creating the multilingual natural language model by training a natural-language model using the translated corpus.

9. The method of claim 8, wherein the multilingual natural language model was further generated by an augmented translated corpus, wherein the augmented translated corpus was generated by:

randomly selecting, from the translated, annotated corpus, a plurality of annotated utterances;

for each selected annotated utterance, delexicalizing the utterance by replacing the slot values in the utterance with the corresponding slot labels; and adding each delexicalized utterance to the translated, annotated corpus.

10. The method of claim 8, wherein the multilingual natural language model was further generated by an augmented translated corpus, wherein the augmented translated corpus was generated by:

randomly selecting, from the translated, annotated corpus, a plurality of annotated utterances;

for each selected annotated utterance, codeswitching the utterance by:

selecting a word in the utterance;

translating the selected word into a different language;

replacing the selected word with the translated word; and adding each codeswitched utterance to the translated, annotated corpus.

11. The method of claim 8, wherein the multilingual natural language model was further generated by:

generating a plurality of translated, annotated corpuses in a plurality of corresponding second languages; and training the natural-language model using each of the plurality of translated corpuses.

12. The method of claim 8, wherein determining, using a multilingual natural language model, one or more intent labels and one or more slot labels for the utterance comprises:

translating the utterance into one or more parallel utterances, each parallel utterance being in a different language;

determining, by the multilingual natural language model and for each utterance, one or more initial intent labels and one or more initial slot labels; and determining, based on the initial intent labels and the one or more initial slot labels, one or more final intent labels and one or more final slot labels for the utterance.

13. The method of claim 12, wherein the one or more final intent labels comprise a most frequently determined one or more initial intent labels, and the one or more final slot labels comprise a most frequently determined one or more initial slot labels.

14. The method of claim 8, wherein the multilingual natural language model is part of a dialogue system.

15. One or more non-transitory computer readable storage media storing software comprising:

a multilingual natural language model defined by a plurality of model parameters, the plurality of model parameters generated by:

accessing an initial corpus of ground-truth utterances in a first language, each ground truth utterance annotated with one or more intent labels and one or more slot labels, each slot label having an associated slot value;

generating a translated, annotated corpus in a second language by, for each annotated utterance in the initial corpus:

delexicalizing the annotated utterance by replacing each slot value with its respective slot label in the annotated ground-truth utterance, wherein each delexicalized utterance comprises a first portion including one or more slot labels without any slot values and a second portion including all other words in the delexicalized utterance;

creating a translated delexicalized utterance comprising the second portion in a second language and the first portion in the first language by translating each second portion of the delexicalized utterance into a second language without modifying the first portion of the delexicalized utterance;

creating a translated slots portion comprising (1) each slot value in the second language and (2) its corresponding slot label in the first language by translating, separately from the translation of each portion of the delexicalized utterance, each slot value to the second language;

creating a translated annotated utterance by adding, to the translated delexicalized utterance, each translated slot value from the translated slots portion at that slot value's corresponding slot label's position in the delexicalized utterance; and training a natural-language model using the translated corpus.

16. The media of claim 15, wherein at least some of the plurality of model parameters are further determined by, prior to training:

randomly selecting, from the translated, annotated corpus, a plurality of annotated utterances;

for each selected annotated utterance, delexicalizing the utterance by replacing the slot values in the utterance with the corresponding slot labels; and adding each delexicalized utterance to the translated, annotated corpus.

17. The media of claim 15, wherein at least some of the plurality of model parameters are further determined by, prior to training:

randomly selecting, from the translated, annotated corpus, a plurality of annotated utterances;

for each selected annotated utterance, codeswitching the utterance by:

selecting a word in the utterance;

translating the selected word into a different language;

replacing the selected word with the translated word; and adding each codeswitched utterance to the translated, annotated corpus.

18. The media of claim 15, wherein at least some of the plurality of model parameters are further determined by:

generating a plurality of translated, annotated corpuses in a plurality of corresponding second languages; and training the natural-language model using each of the plurality of translated corpuses.

19. The media of claim 15, wherein the media is coupled to one or more processors that are operable to execute the software to determine, using the multilingual natural language model, one or more intent labels and one or more slot labels for an input utterance.

20. The media of claim 19, wherein the media and the one or more processors are part of a dialogue system.

* * * * *